(12) United States Patent
Effern et al.

(10) Patent No.: US 11,831,525 B1
(45) Date of Patent: Nov. 28, 2023

(54) ANOMALY DETECTION USING UNSUPERVISED LEARNING AND SURROGATE DATA SETS

(71) Applicant: SAP SE, Walldorf (DE)

(72) Inventors: Arndt Effern, Sinsheim-Duhren (DE); Maximilian Schmidtke, Sinsheim (DE); Erkan Emre, Hockenheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/191,237

(22) Filed: Mar. 28, 2023

(51) Int. Cl.
| | |
|---|---|
| *H04L 12/24* | (2006.01) |
| *H04L 43/08* | (2022.01) |
| *H04L 41/16* | (2022.01) |
| *H04L 12/26* | (2006.01) |

(52) U.S. Cl.
CPC .............. *H04L 43/08* (2013.01); *H04L 41/16* (2013.01)

(58) Field of Classification Search
CPC ......... H04L 43/08; H04L 41/16; H04L 12/24; H04L 12/26
USPC ........................................................ 709/224
See application file for complete search history.

(56) References Cited

U.S. PATENT DOCUMENTS

| | | | |
|---|---|---|---|
| 2019/0391901 A1 | 12/2019 | Gupta et al. | |
| 2021/0136098 A1 | 5/2021 | Stergioudis et al. | |
| 2021/0158260 A1* | 5/2021 | Kolar | H04L 67/1044 |
| 2021/0281492 A1* | 9/2021 | Di Pietro | G06N 5/022 |
| 2021/0304891 A1 | 9/2021 | Kozloski et al. | |
| 2021/0352090 A1* | 11/2021 | Kim | H04L 49/208 |
| 2021/0367885 A1* | 11/2021 | Lin | H04L 41/142 |
| 2021/0397500 A1 | 12/2021 | Wieder et al. | |
| 2022/0129791 A1 | 4/2022 | Nia et al. | |
| 2022/0174511 A1* | 6/2022 | Kvernvik | H04L 41/147 |
| 2022/0191085 A1 | 6/2022 | Li et al. | |
| 2022/0368614 A1* | 11/2022 | Lee | G06F 18/2155 |
| 2023/0023646 A1* | 1/2023 | Xu | H04L 41/16 |

OTHER PUBLICATIONS

Kriegel, Hans-Peter et al., "LoOP: Local Outlier Probabilities", CIKM'09, Nov. 2-6, 2009, (pp. 1649-1652, 4 total pages).

Wang, Lin et al., "Log-based Anomaly Detection from Multi-view by Associating Anomaly Scores with User Trust", 2021 IEEE 20th International Conference on Trust, Security and Privacy in Computing and Communications (TrustCom), 2021, DOI 10.1109/TrustCom53373.2021.00096, (pp. 643-650, 8 total pages).

\* cited by examiner

*Primary Examiner* — Jude Jean Gilles
(74) *Attorney, Agent, or Firm* — Buckley, Maschoff & Talwalkar LLC (57) ABSTRACT

Systems and methods include determination of training data instances associated with a respective time periods based on time-series data of each of several metrics, training of a score generator, based on the training data instances, to generate an outlier score, generation of surrogate time-series data of each of the metrics based on the time-series data of each of the metrics, determination of input data instances associated with each one of the respective time periods based on the surrogate time-series data, input of the input data instances to the trained score generator to generate an outlier score for each input data instance, determination of a threshold based on the outlier scores, identification of ones of the training data instances associated with an outlier score greater than the threshold, and identification of an anomaly associated with each of the training data instances associated with an outlier score greater than the threshold.

20 Claims, 11 Drawing Sheets

ANOMALY DETECTION USING UNSUPERVISED LEARNING AND SURROGATE DATA SETS

BACKGROUND

Modern organizations often utilize a system landscape consisting of distributed computing systems providing various computing services. For example, in order to implement desired functionality, an organization may deploy services within on-premise data centers (which themselves may be located in disparate geographic locations) and within data centers provided by one or more infrastructure as-a-service (IaaS) providers. A system landscape may also include computing systems operated by third parties, which are accessed using region-specific access points defined by the third parties. Any number of the computing systems may comprise cloud-based systems (e.g., providing services using scalable-on-demand virtual machines).

Anomalies are rare items, events or observations that differ significantly from normal system states. Anomalous behavior of technical components (e.g., network adapters, containers) within a system landscape contributes negatively to the overall operational cost of the landscape. It is therefore desirable to efficiently detect and classify anomalies which occur within a system landscape. Once detected, additional processes may determine whether an anomaly represents a problem and, if so, automatically initiate resolution of the problem.

Sensors may be used to generate streams of data (e.g., time-series data of metric values) which together represent the state of computing systems within a system landscape. It is desirable to use the data streams to detect anomalies and to determine the root cause of each detected anomaly. In theory, a classifier may be trained to perform this classification task. However, due to the complexity of this classification task, a vast amount of labeled data is required to achieve the desired precision and recall of the classifier. Labelling large data sets consisting of data streams with root causes is expensive and requires expert knowledge. Moreover, since anomalies are rare, acquisition of sufficient amounts of labeled data associated with each root cause may be practically impossible.

Re-occurring problems are often associated with a limited number of root causes. Metrics that are relevant for a specific re-occurring problem may be determined, for example based on practical experiences of domain experts, and used to define tailored data sets for training an anomaly detection and classification system which is specific to the problem. Such problem-specific data sets allow division of the above-described complex classification task into independent lighter-weight binary classification tasks which can determine the degree to which a new instance of tailored data set is "normal" or "anomalous".

Due to the labelling problems described above, approaches for implementing these binary classification tasks must use unsupervised learning techniques. These approaches include the use of recurrent artificial neural networks (RNNs) such as Long Short-Term Memory networks. These networks predict future samples of a "normal" time series, and the distance between actual values and the predicted samples can be interpreted as a score indicating the extent of anomalous behavior. Other classification approaches such as Nearest Neighbors or Local Outlier Factor determine density measures which may assist in the identification of outliers (i.e., abnormal states) of a system. Local Outlier Probability provides an anomaly score in the range of [0, 1], which can be interpreted as the probability of an instance of a data set being "anomalous" to a given level of confidence.

The above approaches determine an anomaly-related value associated with an instance of a data set and do not provide a binary decision indicating whether the instance is "normal" or "anomalous". Rather, a user or other downstream process must interpret the anomaly-related value, for example by determining a threshold and comparing the value against the threshold to determine whether the value represents normal behavior or an anomaly. A poorly-determined threshold may result in the determination of too many or too few anomalies.

Determination of an appropriate threshold is difficult. The appropriate threshold may vary over time, across different computing systems and across different problem types. Systems are desired for efficiently and dynamically determining an appropriate score threshold for classifying an instance of a data set as an anomaly.

BRIEF DESCRIPTION OF THE DRAWINGS

FIG. 1 illustrates a system to detect anomalies using unsupervised learning and surrogate data sets according to some embodiments.

FIGS. 2A and 2B comprise a flow diagram of a process to detect anomalies using unsupervised learning and surrogate data sets according to some embodiments.

FIGS. 3A and 3B illustrate determination and serializing of time-series data windows according to some embodiments.

FIG. 4 illustrates unsupervised training of an outlier score generator based on time-series data windows according to some embodiments.

FIG. 5 illustrates time-series data for each of a plurality of metrics and a corresponding time series of outlier scores according to some embodiments.

FIG. 6 illustrates generation of surrogate time-series data for each of a plurality of metrics according to some embodiments.

FIG. 7 illustrates generation of outlier scores for each of a plurality of surrogate time-series data windows according to some embodiments.

FIG. 8 illustrates identification of anomalies based on a maximum outlier score for each of a plurality of surrogate time-series data windows according to some embodiments.

FIG. 9 illustrates a system to detect anomalies associated with multiple problems using problem-specific sets of metrics, unsupervised learning and surrogate data sets according to some embodiments.

FIG. 10 is a block diagram of cloud-based servers of a landscape providing automated anomaly detection according to some embodiments.

DETAILED DESCRIPTION

The following description is provided to enable any person in the art to make and use the described embodiments. Various modifications, however, will remain readily-apparent to those in the art.

Some embodiments provide a system to estimate suitable score thresholds in unsupervised environments without labeled data sets. Some embodiments assume that an arbitrary data set is dominated by normal system states even if it includes some anomalies. Accordingly, embodiments may produce new, or "surrogate" data sets that are similar to acquired arbitrary data sets but which do not include anomalies. Such generated surrogates can then be used as a reference to discriminate normal from anomalous states without the need for a-priori data labeling.

Some embodiments train a generative model to generate a surrogate data set from an arbitrary data set. Even if anomalies exist in the arbitrary data set, these anomalies do not reflect main characteristics of the data set and therefore will not be generalized by a well-sized generative model. In other embodiments, an original set of time-series data is transformed into the Fourier-space and the phases of the Fourier-components are randomly shuffled. The shuffled data set is then transformed back into a time-series data set using the inverse Fourier-transformation. The resulting surrogate data set exhibits the same spectral characteristics as the original data set, but without anomalies. Any anomalies which exist in the original data set are blurred along the time series.

Anomaly detection as described herein can be used to enrich top-level alerting, such as violation of service level agreements. Embodiments may accelerate root cause analysis in case incidents. Moreover, embodiments may facilitate the labeling of historical data sets, which may then be used for supervised training of a system to perform complex classification tasks.

Figure 1:
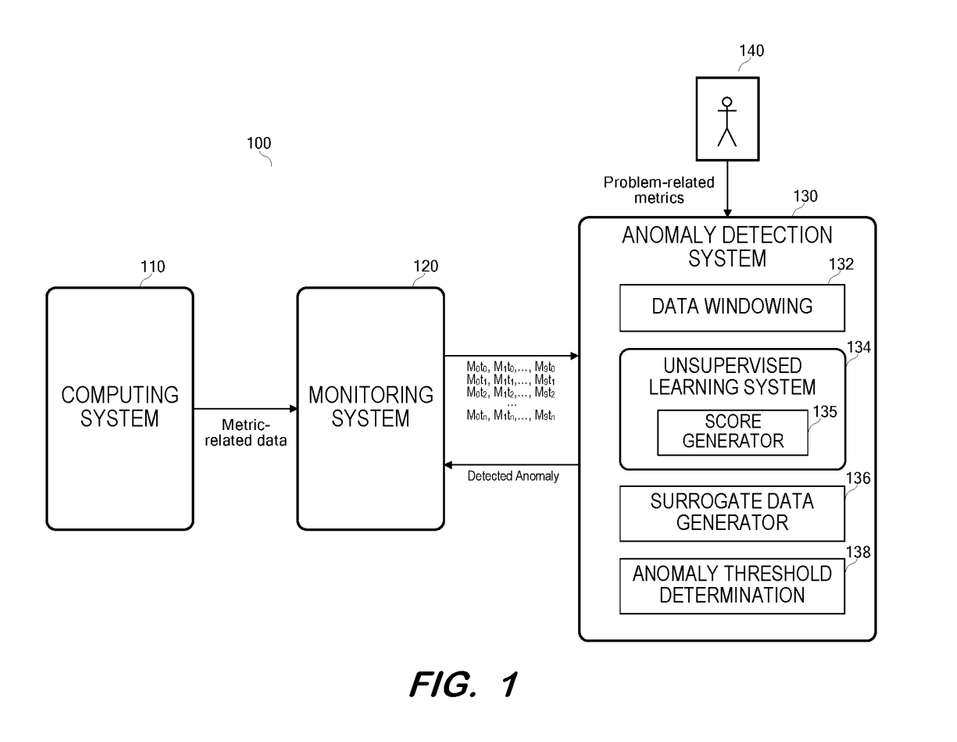

FIG. 1 illustrates system 100 according to some embodiments. The illustrated components of system 100 may be implemented using any suitable combinations of computing hardware and/or software that are or becomes known. Such combinations may include cloud-based implementations in which computing resources are virtualized and allocated elastically. In some embodiments, two or more components are implemented by a single computing device.

Computing system 110 may comprise any number of hardware and software components which may provide functionality to one or more users (not shown). Computing system 110 may comprise a landscape of disparate cloud-based services, a single computer server, a cluster of servers, and any other combination that is or becomes known.

Computing system 110 generates metric-related data. Such data may be related to metrics associated with resource consumption (e.g., CPU utilization, memory utilization, bandwidth consumption), hardware performance (e.g., read/write speeds, bandwidth, CPU speed), application performance (e.g., queries served per second, number of simultaneous sessions), and any other metrics that are or become known. The data generated for each metric may comprise time-series data, and may be generated at different respective time intervals.

Monitoring system 120 may comprise any suitable system to receive the metric-related data generated by computing system 110. Monitoring system 120 may query computing system 110 for selected metric-related data, may subscribe to the selected metric-related data, may receive metric-related data pushed from computing system 110, or may acquire the metric-related therefrom using any suitable protocol. Monitoring system 120 may execute an application for recording real-time metric data in a time series database using an HTTP pull model, such as but not limited to Prometheus.

Monitoring system 120 provides time-series data of each of a plurality of metrics to anomaly detection system 130. In the illustrated example, data for each metric associated with a first time point (e.g., $M_0t_0, M_1t_0, \ldots, M_9t_0$, given metrics $M_0$-$M_9$) is provided, followed by data for each metric associated with a next relevant time point (e.g., $M_0t_1, M_1t_1, \ldots, M_9t_1$), and so on. Embodiments are not limited thereto. For example, monitoring system 120 may provide the data for each metric to anomaly detection system 130 as an independent time-series (e.g., $M_0t_0, M_0t_1, \ldots, M_0t_n$; $M_1t_0, M_1t_1, \ldots, M_1t_n$; $\ldots M_9t_0, M_9t_1, \ldots, M_9t_n$). In cases where the data is generated by computing system 110 at high sampling rates, and in order to reduce processing costs, monitoring system 120 may provide time-series data based on a reasonable time delta $\Delta t$ (e.g., $M_0t_0$, $M_0(t_0+1*\Delta t)$, $M_0(t_0+2*\Delta t), \ldots, M_0(t_0+n*\Delta t)$) if a higher sampling rate is not required for anomaly detection.

Monitoring system 120 may perform any suitable processing on the data prior to providing the data to anomaly detection system 130, including but not limited to noise reduction, normalization, and filtering. For example, the time series may be normalized using a standard scaler with average 0 before serialization, in order to avoid artifacts due to the different scales of different metrics M. Pre-processing may also or alternatively be performed by system 130. In a similar regard, the processes attributed herein to system 130 may be performed in whole or in part by monitoring system 120 according to some embodiments.

Anomaly detection system 130 determines a score threshold for use in identifying a past anomaly. Generally, anomaly detection system 130 trains a score generator to generate an outlier score based on the received time-series data, generates surrogate time-series data based on the received time-series data, inputs the surrogate time-series data to the trained score generator to determine an outlier score threshold for identification of an anomaly, and compares outlier scores generated by the trained score generator based on the received time-series data to the outlier score threshold to identify anomalies in the received time-series data.

More particularly, according to some embodiments, data windowing component 132 of anomaly detection system 130 generates training data instances based on the data received from monitoring system 120. Each training data instance includes time-series data of each relevant metric for a given respective time period. The time periods associated with two or more training data instances may partially overlap (thus the use of the term "windowing").

Unsupervised learning system 134 trains score generator 135 to output an outlier score based on the training data instances. Score generator 135 may comprise an RNN as described above, a Nearest Neighbors algorithm, an Isolation Forest algorithm, a Local Outlier Factor algorithm or a Local Outlier Probability algorithm, for example. Unsupervised learning system 134 may comprise any suitable system to train the selected type of score generator 135.

Training of score generator 135 may include input of training data, acquisition of resulting output, modification of score generator 135 based on the output, and determination to terminate training upon satisfaction of a given target (e.g., an accuracy level, an elapsed time period, a number of iterations). The trained score generator 135 may receive a data instance consisting of the values of several metrics at different time points and output an outlier score predicting a degree to which the data instance represents an anomaly. As noted above, the outlier score does not indicate whether the data instance does or does not represent an anomaly.

Surrogate data generator 136 generates surrogate time-series data for each metric, based on the time-series data of that metric which was received from monitoring system 120. Surrogate data generator 136 may comprise a generative model or an autoencoder trained to generate time-series data having similar spectral characteristics to input time-series data, but without including any anomalies. According to some embodiments, and for each metric, surrogate data generator 136 applies a Fourier transform to the associated acquired time-series data, performs phase-shuffling of the resulting frequency components, and applies an inverse Fourier transform to return the data to the time domain.

The surrogate time-series data for each metric is then input to the trained score generator 135. As described above, data windowing component 132 creates surrogate data instances consisting of surrogate time-series data of each metric for a given respective time period. The time periods may be the same time periods used to generate the training data instances used to train score generator 135. The surrogate data instances are input to score generator 135, resulting in an outlier score for each surrogate data instance (and for each time period represented by each surrogate data instance).

Anomaly threshold determination component 138 determines a score threshold based on the outlier scores generated based on the surrogate data instances. In some embodiments, the score threshold is equal to the highest of the generated outlier scores. Embodiments are not limited thereto. For example, if several outlier scores are much higher than the other outlier scores, the score threshold may be determined as the smallest of the several higher outlier scores, the average of the several higher outlier scores, or in any other manner.

Anomaly detection system 130 then identifies those training data instances which, when input to trained score generator 135, result in an outlier score greater than the determined threshold. The identified training data instances are each determined to represent an anomaly. Stated differently, an anomaly is detected for each of the time periods represented by the identified training data instances. In contrast to prior systems which merely output an outlier score, an appropriate user, administrator or department may be automatically notified of the detected anomalies without requiring further processing or user judgment.

The above process may be repeated successively after the acquisition of new time-series data by monitoring system 120. A subsequent execution of the process may use some of the time-series data which was used during a previous execution of the process, or all new time-series data. Since score generator 135 is re-trained during the subsequent execution using at least partially new training data instances, and because the generated surrogate time-series data differs from the previous execution, the newly-determined score threshold may differ from the previously-determined score threshold. This dynamic determination of the score threshold may advantageously adapt to natural, innocuous changes to computing system 110 over time and may result in more reliable detection of anomalies than prior systems.

System 100 shows domain expert 140 in communication with system 130. Domain expert 140 may provide a particular set of metrics which are believed to be indicative of a particular type of system problem. According to some embodiments, these metrics are the metrics whose time-series data is used to train score generator 135 and is converted to surrogate time-series data. Accordingly, the anomalies detected by system 130 as described above are indicative of a potential occurrence of the particular type of problem. Any notifications of the detected anomalies may therefore also include an identification of the problem.

Anomaly detection system 130 may perform the process described above for different sets of metrics which are indicative of different problems. Each of these processes may be performed in parallel. One or more metrics may be included in two or more such sets of metrics.

Figure 2A:
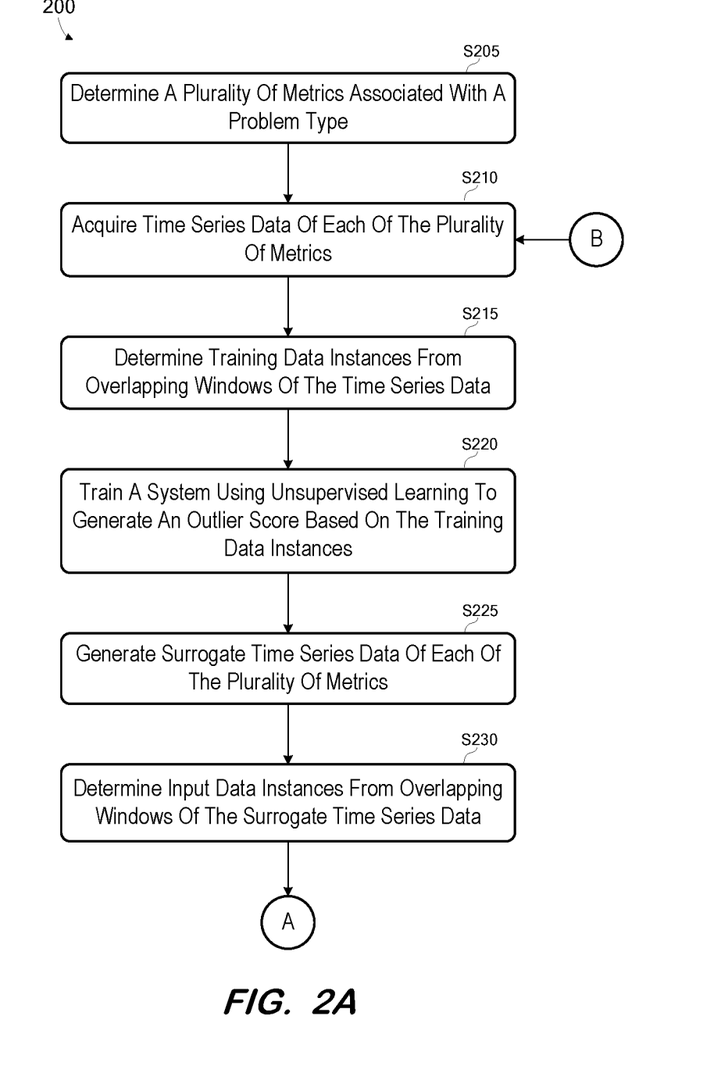
Figure 2B:
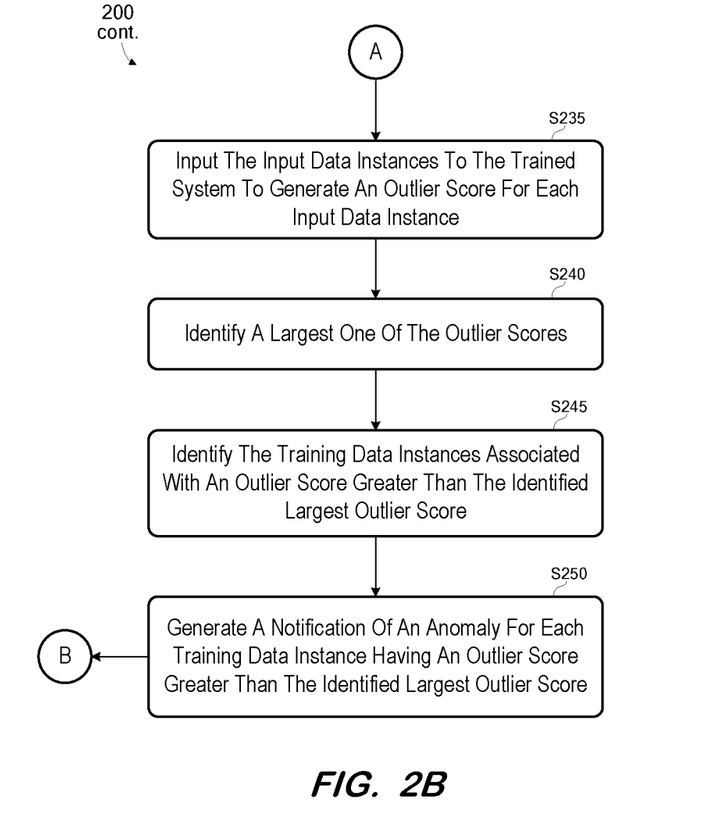

FIGS. 2A and 2B comprise a flow diagram of process 200 to detect anomalies according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, at S205, a plurality of metrics associated with a problem type are determined. The plurality of metrics may be determined from a domain expert. Computing systems may generate hundreds of metrics, many of which may be irrelevant to detection of a particular type of problem. Leveraging knowledge of a domain expert, the plurality of metrics determined at S205. Leveraging knowledge of a domain expert, the plurality of metrics determined at S205 may be narrowed to a set of indicators of a specific problem, thereby specializing from a general problem detector to a detector of specific problem classes.

At S210, time-series data of each of the plurality of metrics is acquired. The data may be acquired by a monitoring component which obtains the data from one or more computing systems, and/or directly from the one or more computing systems. The acquired time-series data includes, for each metric, a value of the metric at different points in time. Training data instances are determined from overlapping windows of the time-series data at S215. The windows need not overlap in some embodiments.

Figure 3A:
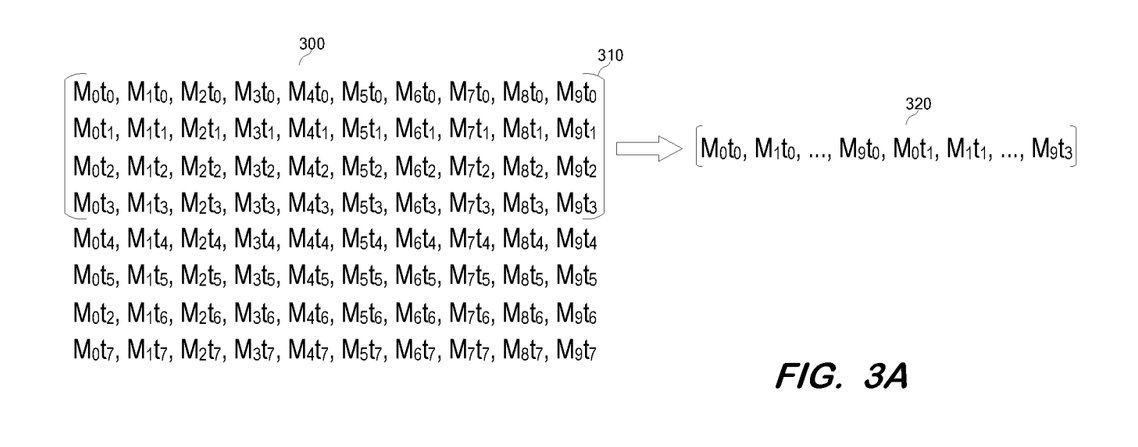
Figure 3B:
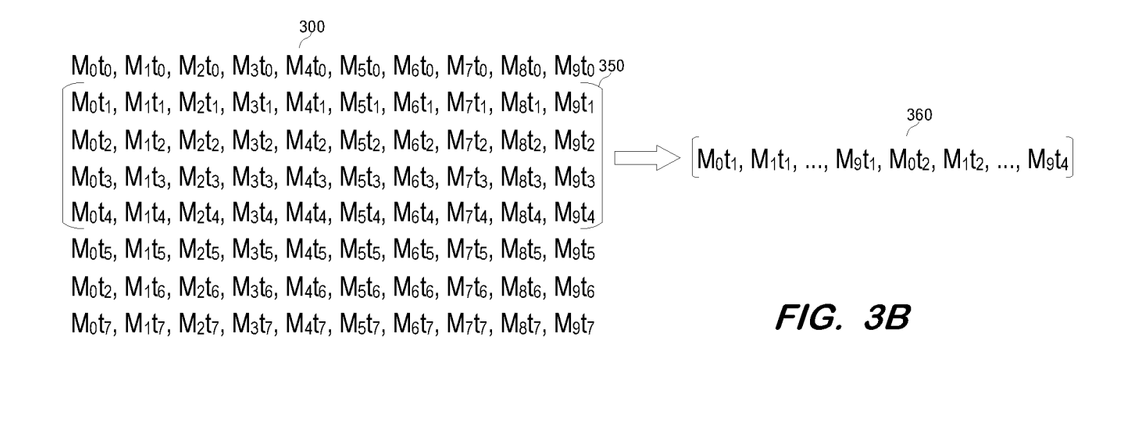

FIGS. 3A and 3B illustrates determination of training data instances at S215 according to some embodiments. Time-series data 300 received at S210 includes values of each of ten metrics $M_0$-$M_9$ for each of eight time points $t_0$-$t_7$. Window 310 of FIG. 3A includes time points $t_0$-$t_3$. The data of window 310 comprises a single training data instance. FIG. 3A illustrates serialization of the data of window 310 into serialized instance 320 in order to comply with an API of a score-determining algorithm (e.g., Local Outlier Probability), but embodiments are not limited thereto.

FIG. 3B shows window 350 on data 300. Window 350 includes time points $t_1$-$t_4$ and therefore overlaps the time period included within window 310. The data within window 350 also comprises a single training data instance, and may be serialized into serialized instance 360. Any suitable processing may be performed on the data prior to or after serialization, including but not limited to noise reduction, normalization, and filtering.

A system is trained at S220 using unsupervised learning to generate an outlier score. The training is based on the training data instances determined at S215. The outlier score represents a degree to which an input instance might represent an anomaly, but does not indicate whether the data instance does or does not represent an anomaly. The training is unsupervised because the training data instances are unlabeled (i.e., not associated with an indication of whether or not they are examples of an anomaly). The score-generating system may comprise an RNN, a Nearest Neighbors algorithm, an Isolation Forest algorithm, a Local Outlier Factor algorithm or a Local Outlier Probability algorithm, for example.

Figure 4:
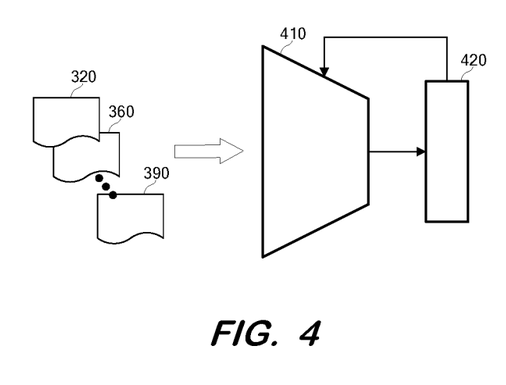

FIG. 4 illustrates training of score generator 410 at S220 according to some embodiments. Training data instances 320, 360 and 390 are input to generator 410 and the resulting scores are received by evaluation component 420. Evaluation component 420 may modify generator 410 based on the output scores, and the process repeats until component 420 determines that training is complete.

Figure 5:
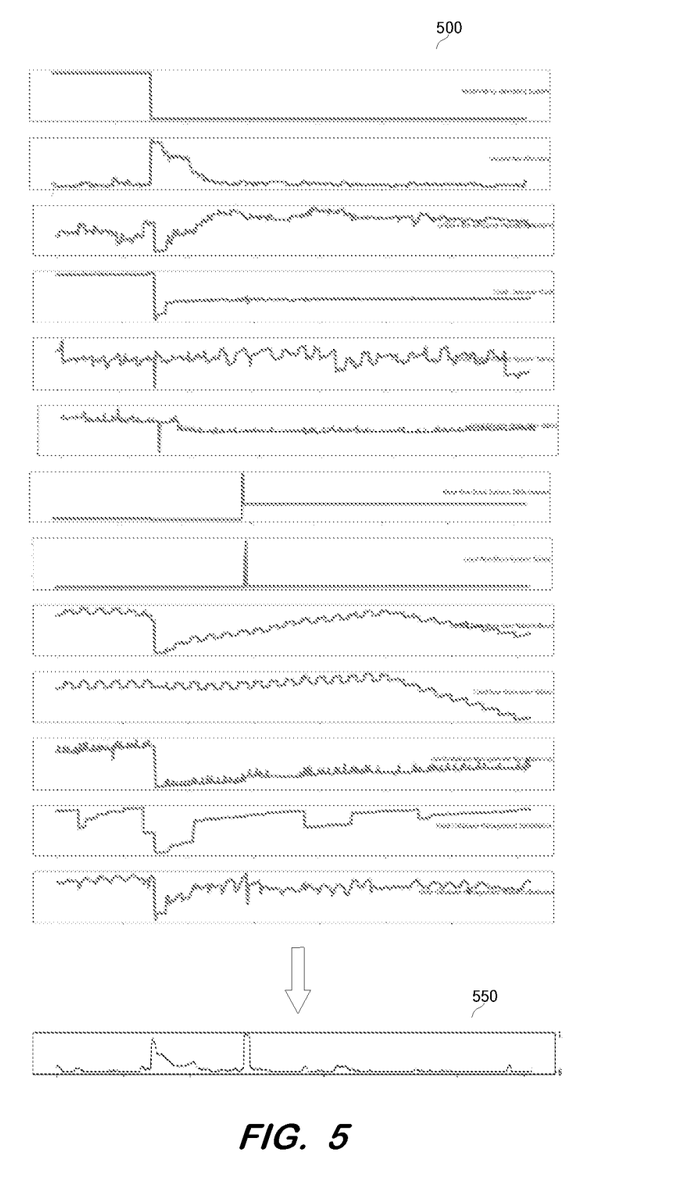

FIG. 5 illustrates time-series data 500 of thirteen metrics which may be acquired at S210. Training data instances may be determined at S215 based on time-series data as described above, and a system may be trained at S220 to output an outlier score based on the training data instances. Scores 550 illustrates outlier scores determined by the trained system for each training data instance, where the horizontal axis indicates the time period of the corresponding training data instance. In the present example using a Local Outlier Probability algorithm, the outlier scores range between 0 and 1.

Figure 6:
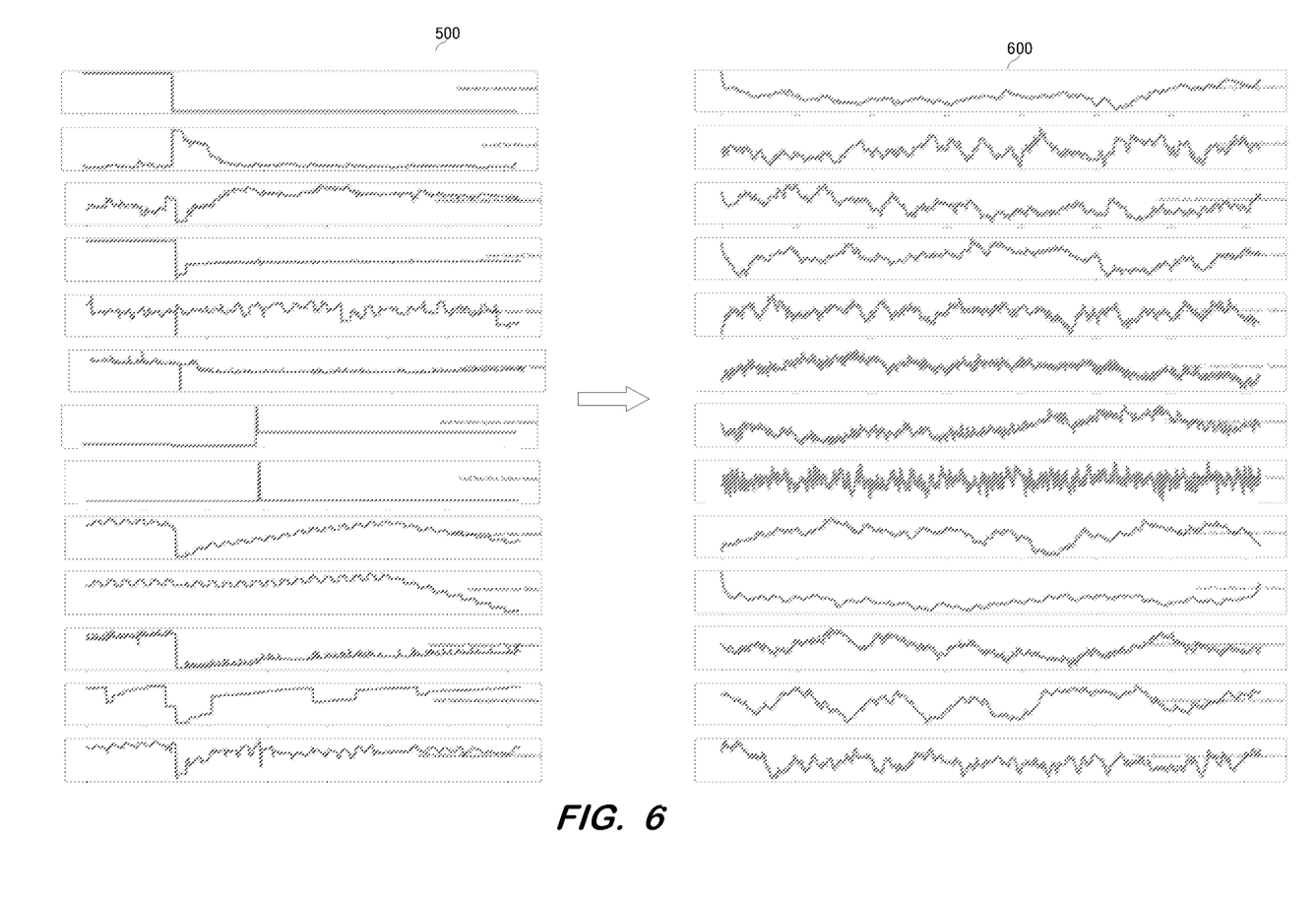

Surrogate time-series data for each metric is generated at S225. The surrogate time-series data may be generated by a generative model or an autoencoder trained to generate time-series data having similar characteristics to input time-series data, but without including any anomalies. In other embodiments, S225 includes applying a Fourier transform to time-series data of a metric, phase-shuffling the resulting frequency components, and applying an inverse Fourier transform to return the data to the time domain. These steps are performed independently for the time-series data of each metric, to generate surrogate time-series data for each metric. FIG. 6 illustrates time-series data 500 described above and corresponding surrogate time-series data 600 generated from data 500 at S225 using the Fourier transform-based method.

Input data instances are determined from overlapping windows of the surrogate time-series data at S230. The input data instances may be determined in the same manner as described above with respect to the training data instances, and using the same time periods used to generate the training data instances.

Figure 7:
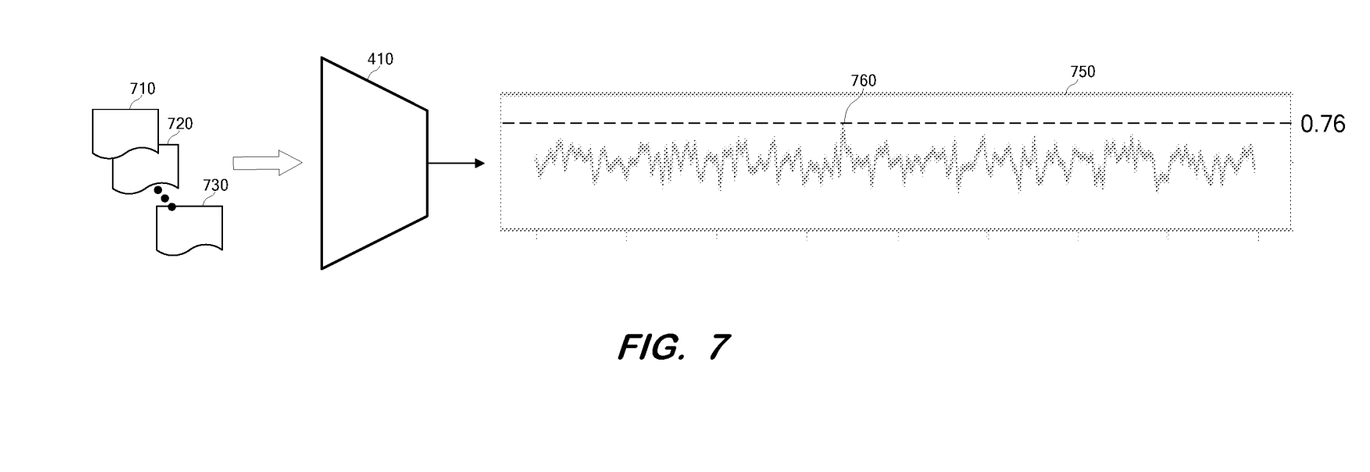

The input data instances are input to the trained score generator at S235 to generate an outlier score for each input data instance. For example, each of input data instances 710, 720 and 730 of FIG. 7 was generated based on a different time period of the same set of surrogate time-series data (e.g., data 600). Input data instances 710, 720 and 730 are input to trained score generator 410 at S235 to generate outlier scores 750, where the horizontal position of an outlier score indicates the time period of the training data instance which resulted in the outlier score.

A largest one of the outlier scores is identified at S240. Continuing the present example of FIG. 7, the largest score is 0.76, associated with peak 760 of scores 750. This score will be used as a score threshold for determining whether a training data instance represents an anomaly or not. Embodiments are not limited to the highest of the generated outlier scores. Rather, the score threshold may be calculated in any manner based on any one or more of the outlier scores generated at S235.

Figure 8:
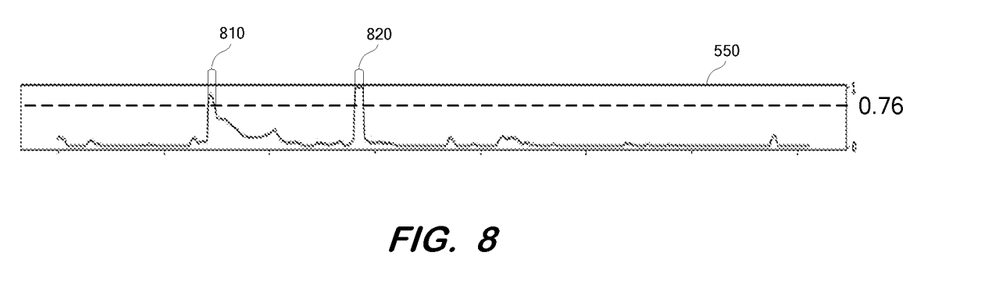

Next, at S245, the training data instances which, when input to the trained score generator, result in an outlier score greater than the determined threshold are identified. FIG. 8 illustrates scores 550 resulting from training data instances generated based on training data 500. As shown, the scores 550 resulting from training data instances associated with time periods 810 and 820 exceed the score threshold of 0.76. The training data instances associated with time periods 810 and 820 are therefore determined to represent an anomaly.

In some cases, surrogate time-series data might contain anomaly-like patterns due to random interferences in phase space. These patterns may result in determination of a larger than optimal score threshold. To address this possibility, S225-S240 could be repeated several times for the same time window, with the final threshold equal to a mean or average value of the intermediately-determined score thresholds. Alternatively, and to avoid extra calculations per time window, some embodiments determine the threshold as a weighted average of the last n determined thresholds (e.g., n=8) with exponential decay.

At S250, a notification of an anomaly is generated for each of the identified training data instances. The notification may include the time periods associated with the training data instances, values of each of the plurality of metrics during the time periods, and an identification of the associated problem type.

Flow returns to S210 to acquire next time-series data of each of the plurality of metrics. Process then continues as described above, using only newly-acquired time-series data or also some of the time-series data which was used during the previous execution of process 200. Accordingly, the system is re-trained at S220 using at least partially new training data instances, and the generated surrogate time-series data differ from those generated during the previous execution. Therefore, the score threshold next determined at S240 may differ from the previously-determined score threshold.

In some embodiments, after a first execution of process 200, flow cycles between S210, S245 and S250 to acquire data and identify anomalies based on the currently-determined outlier score threshold. During this execution, the threshold will not change (i.e., adapt to newly-seen data) but the time required to identifier anomalies will be reduced. Retraining (i.e., execution of all steps S210-S250) may be then executed occasionally.

As mentioned above, different instances of process 200 may be performed for different sets of metrics associated with different problem types. Each of these instances may be performed in parallel. Moreover, two or more of these different sets of metrics may include one or more of the same metrics.

Figure 9:
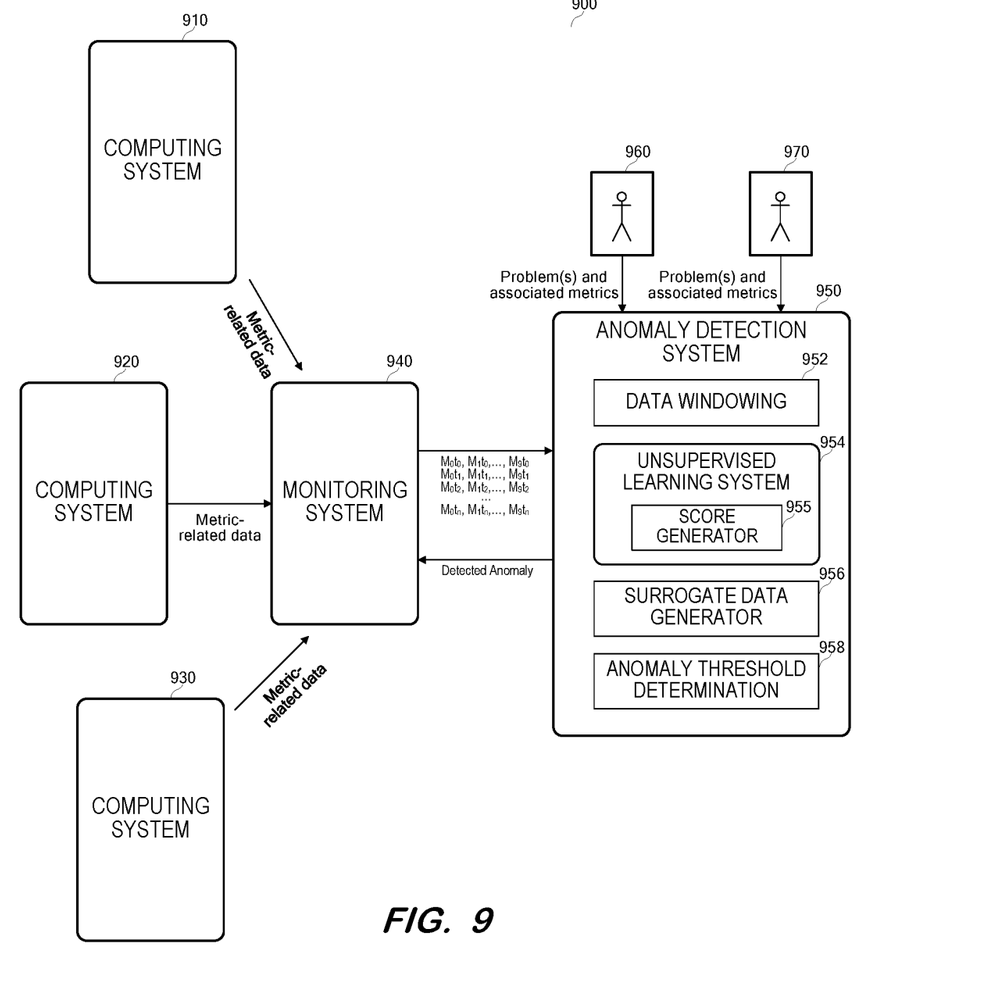

FIG. 9 illustrates landscape 900 according to some embodiments. Landscape 900 includes computing systems 910 through 930, each of which may be implemented as described above with respect to computing system 110. Computing systems 910 to 930 may be located remote from one another and may be operated by different entities, for example. Each of computing systems 910 through 930 provides time-series metric-related data to monitoring system 940. Monitoring system 940, in turn, provides the time-series metric-related data from each of computing systems 910 through 930 to anomaly detection system 950.

Anomaly detection system 950 and its components 952 through 958 may operate as described above with respect to anomaly detection system 130. In this regard, domain experts 960 and 970 may each provide system 950 with a respective set of metrics for each of one or more problem types. Anomaly detection system 950 may execute in parallel an instance of process 200 for each problem type, using the respective set of metrics for each problem type. It is assumed that the time-series metric-related data provided by monitoring system 940 includes all of the metrics of each set of metrics, and that a particular metric may be included in one or more of the sets of metrics.

In some embodiments, monitoring system 940 provides time-series metric-related data as well as identifiers of the system 910-930 from which the data of each time-series was acquired. Anomaly detection system 950 may use this information to train computing system-dependent models and determine computing system-dependent thresholds as described above.

Figure 10:
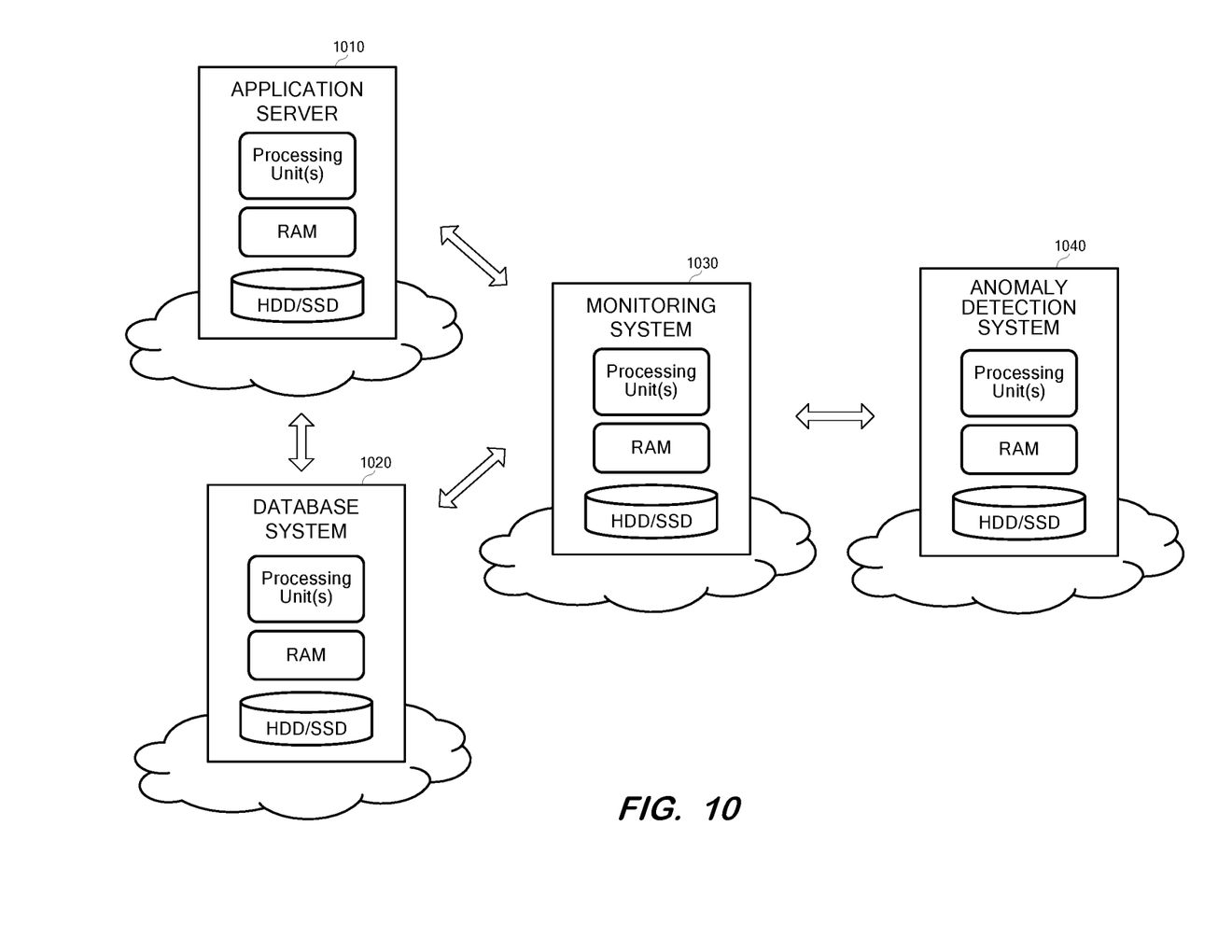

FIG. 10 illustrates a cloud-based database deployment according to some embodiments. The illustrated components may comprise cloud-based compute resources residing in one or more public clouds providing self-service and immediate provisioning, autoscaling, security, compliance and identity management features.

Application server 1010 and database server 1020 may operate to provide one or more services to users. In this regard, application server 1010 and database server 1020 may comprise an implementation of computing system 110, or of computing systems 910 and 920.

Monitoring system 1030 receives metric-related time series data from each of application server 1010 and database server 1020. Anomaly detection system 1040 receives this data (or a subset) thereof from monitoring system 1030. Anomaly detection system 1040 may operate as described herein to identify anomalies based on the received time-series data.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
 a memory storing processor-executable program code; and
 at least one processing unit to execute the processor-executable program code to cause the system to:
 determine a first plurality of computing system metrics;
 acquire time-series data of each of the plurality of metrics;
 determine training data instances based on the time-series data, each of the training data instances associated with a respective time period;
 train a score generator, based on the training data instances, to generate an outlier score;
 generate surrogate time-series data of each of the plurality of metrics based on the time-series data of each of the plurality of metrics;
 determine input data instances based on the surrogate time-series data;
 input the input data instances to the trained score generator to generate an outlier score for each of the input data instances;
 determine a threshold based on the outlier scores generated for the input data instances;
 identify ones of the training data instances associated with an outlier score greater than the threshold; and
 identify an anomaly associated with each of the ones of the training data instances associated with an outlier score greater than the threshold.

2. A system according to claim 1, wherein a surrogate time-series data of one of the plurality of metrics has characteristics similar to characteristics of the acquired time-series data of the one of the plurality of metrics.

3. A system according to claim 1, wherein generation of surrogate time-series data of one of the plurality of metrics comprises:
 application of a Fourier transform to the acquired time-series data of the one of the plurality of metrics to generate Fourier components;
 phase-shuffling of the Fourier components; and
 application of an inverse Fourier transform to the phase-shuffled components.

4. A system according to claim 1, wherein a time period associated with one of the training data instances overlaps a time period associated with another one of the training data instances.

5. A system according to claim 1, the at least one processing unit to execute the processor-executable program code to cause the system to:
 acquire second time-series data of each of the plurality of metrics;
 determine second training data instances based on the second time-series data, each of the second training data instances associated with a respective time period;
 re-train the score generator, based on the second training data instances, to generate an outlier score;
 generate second surrogate time-series data of each of the plurality of metrics based on the second time-series data of each of the plurality of metrics;
 determine second input data instances based on the second surrogate time-series data;
 input the second input data instances to the re-trained score generator to generate an outlier score for each of the second input data instances;
 determine a second threshold based on the outlier scores generated for the second input data instances;
 identify ones of the second training data instances associated with an outlier score greater than the second threshold; and
 identify an anomaly associated with each of the ones of the second training data instances associated with an outlier score greater than the second threshold.

6. A system according to claim 5, the at least one processing unit to execute the processor-executable program code to cause the system to:
 determine a second plurality of computing system metrics;
 acquire third time-series data of each of the second plurality of metrics;
 determine third training data instances based on the third time-series data, each of the third training data instances associated with a respective time period;
 train a second score generator, based on the third training data instances, to generate an outlier score;

11 generate third surrogate time-series data of each of the plurality of metrics based on the third time-series data of each of the second plurality of metrics;

determine third input data instances based on the third surrogate time-series data;

input the third input data instances to the trained second score generator to generate an outlier score for each of the third input data instances;

determine a third threshold based on the outlier scores generated for the third input data instances;

identify ones of the third training data instances associated with an outlier score greater than the third threshold; and identify an anomaly associated with each of the ones of the third training data instances associated with an outlier score greater than the third threshold.

7. A system according to claim 1, the at least one processing unit to execute the processor-executable program code to cause the system to:

determine a second plurality of computing system metrics;

acquire second time-series data of each of the second plurality of metrics;

determine second training data instances based on the second time-series data, each of the second training data instances associated with a respective time period;

re-train the score generator, based on the second training data instances, to generate an outlier score;

generate second surrogate time-series data of each of the second plurality of metrics based on the second time-series data of each of the second plurality of metrics;

determine second input data instances based on the second surrogate time-series data;

input the second input data instances to the re-trained score generator to generate an outlier score for each of the second input data instances;

determine a second threshold based on the outlier scores generated for the second input data instances;

identify ones of the second training data instances associated with an outlier score greater than the second threshold; and identify an anomaly associated with each of the ones of the second training data instances associated with an outlier score greater than the second threshold.

8. A computer-implemented method comprising:

determining a first plurality of computing system metrics associated with a first problem type;

acquiring time-series data of each of the plurality of metrics;

determining training data instances based on the time-series data, each of the training data instances associated with a respective time period;

training a score generator, based on the training data instances, to generate an outlier score;

generating surrogate time-series data of each of the plurality of metrics based on the time-series data of each of the plurality of metrics;

determining input data instances based on the surrogate time-series data;

inputting the input data instances to the trained score generator to generate an outlier score for each of the input data instances;

determining a threshold based on the outlier scores generated for the input data instances;

identifying ones of the training data instances associated with an outlier score greater than the threshold; and

12 identifying an anomaly associated with each of the ones of the training data instances associated with an outlier score greater than the threshold.

9. A method according to claim 8, wherein a surrogate time-series data of one of the plurality of metrics has characteristics similar to characteristics of the acquired time-series data of the one of the plurality of metrics.

10. A method according to claim 8, wherein generating surrogate time-series data of one of the plurality of metrics comprises:

applying a Fourier transform to the acquired time-series data of the one of the plurality of metrics to generate Fourier components;

phase-shuffling the Fourier components; and applying an inverse Fourier transform to the phase-shuffled components.

11. A method according to claim 8, wherein a time period associated with one of the training data instances overlaps a time period associated with another one of the training data instances.

12. A method according to claim 8, further comprising:

acquiring second time-series data of each of the plurality of metrics;

determining second training data instances based on the second time-series data, each of the second training data instances associated with a respective time period;

re-training the score generator, based on the second training data instances, to generate an outlier score;

generating second surrogate time-series data of each of the plurality of metrics based on the second time-series data of each of the plurality of metrics;

determining second input data instances based on the second surrogate time-series data;

inputting the second input data instances to the re-trained score generator to generate an outlier score for each of the second input data instances;

determining a second threshold based on the outlier scores generated for the second input data instances;

identifying ones of the second training data instances associated with an outlier score greater than the second threshold; and identifying an anomaly associated with each of the ones of the second training data instances associated with an outlier score greater than the second threshold.

13. A method according to claim 12, further comprising:

determining a second plurality of computing system metrics associated with a second problem type;

acquiring third time-series data of each of the second plurality of metrics;

determining third training data instances based on the third time-series data, each of the third training data instances associated with a respective time period;

training a second score generator, based on the third training data instances, to generate an outlier score;

generating third surrogate time-series data of each of the plurality of metrics based on the third time-series data of each of the second plurality of metrics;

determining third input data instances based on the third surrogate time-series data;

inputting the third input data instances to the trained second score generator to generate an outlier score for each of the third input data instances;

determining a third threshold based on the outlier scores generated for the third input data instances;

identifying ones of the third training data instances associated with an outlier score greater than the third threshold; and identifying an anomaly associated with each of the ones of the third training data instances associated with an outlier score greater than the third threshold.

14. A method according to claim 8, further comprising:
   determining a second plurality of computing system metrics associated wit a second problem type;
   acquiring second time-series data of each of the second plurality of metrics;
   determining second training data instances based on the second time-series data, each of the second training data instances associated with a respective time period;
   re-training the score generator, based on the second training data instances, to generate an outlier score;
   generating second surrogate time-series data of each of the second plurality of metrics based on the second time-series data of each of the second plurality of metrics;
   determining second input data instances based on the second surrogate time-series data;
   inputting the second input data instances to the re-trained score generator to generate an outlier score for each of the second input data instances;
   determining a second threshold based on the outlier scores generated for the second input data instances;
   identifying ones of the second training data instances associated with an outlier score greater than the second threshold; and
   identifying an anomaly associated with each of the ones of the second training data instances associated with an outlier score greater than the second threshold.

15. A computer-readable medium storing processor-executable program code, the program code executable by a computing system to:
   determine a first plurality of computing system metrics associated with a first problem type;
   acquire time-series data of each of the plurality of metrics;
   determine training data instances based on the time-series data, each of the training data instances associated with a respective time period;
   train a score generator, based on the training data instances, to generate an outlier score;
   generate surrogate time-series data of each of the plurality of metrics based on the time-series data of each of the plurality of metrics;
   determine input data instances based on the surrogate time-series data, each of the input data instances associated with one of the respective time periods;
   input the input data instances to the trained score generator to generate an outlier score for each of the input data instances;
   determine a threshold based on the outlier scores generated for the input data instances;
   identify ones of the training data instances associated with an outlier score greater than the threshold; and
   identify an anomaly associated with each of the ones of the training data instances associated with an outlier score greater than the threshold.

16. A medium according to claim 15, wherein generation of surrogate time-series data of one of the plurality of metrics comprises:
   application of a Fourier transform to the acquired time-series data of the one of the plurality of metrics to generate Fourier components;
   phase-shuffling of the Fourier components; and
   application of an inverse Fourier transform to the phase-shuffled components.

17. A medium according to claim 15, wherein a time period associated with one of the training data instances overlaps a time period associated with another one of the training data instances.

18. A medium according to claim 15, the program code executable by a computing system to:
   acquire second time-series data of each of the plurality of metrics;
   determine second training data instances based on the second time-series data, each of the second training data instances associated with a respective time period;
   re-train the score generator, based on the second training data instances, to generate an outlier score;
   generate second surrogate time-series data of each of the plurality of metrics based on the second time-series data of each of the plurality of metrics;
   determine second input data instances based on the second surrogate time-series data;
   input the second input data instances to the re-trained score generator to generate an outlier score for each of the second input data instances;
   determine a second threshold based on the outlier scores generated for the second input data instances;
   identify ones of the second training data instances associated with an outlier score greater than the second threshold; and
   identify an anomaly associated with each of the ones of the second training data instances associated with an outlier score greater than the second threshold.

19. A medium according to claim 18, the program code executable by a computing system to:
   determine a second plurality of computing system metrics associated with a second problem type;
   acquire third time-series data of each of the second plurality of metrics;
   determine third training data instances based on the third time-series data, each of the third training data instances associated with a respective time period;
   train a second score generator, based on the third training data instances, to generate an outlier score;
   generate third surrogate time-series data of each of the plurality of metrics based on the third time-series data of each of the second plurality of metrics;
   determine third input data instances based on the third surrogate time-series data;
   input the third input data instances to the trained second score generator to generate an outlier score for each of the third input data instances;
   determine a third threshold based on the outlier scores generated for the third input data instances;
   identify ones of the third training data instances associated with an outlier score greater than the third threshold; and
   identify an anomaly associated with each of the ones of the third training data instances associated with an outlier score greater than the third threshold.

20. A medium according to claim 15, the program code executable by a computing system to:
   determine a second plurality of computing system metrics associated with a second problem type;
   acquire second time-series data of each of the second plurality of metrics;
   determine second training data instances based on the second time-series data, each of the second training data instances associated with a respective time period;
   re-train the score generator, based on the second training data instances, to generate an outlier score;

generate second surrogate time-series data of each of the second plurality of metrics based on the second time-series data of each of the second plurality of metrics;

determine second input data instances based on the second surrogate time-series data;

input the second input data instances to the re-trained score generator to generate an outlier score for each of the second input data instances;

determine a second threshold based on the outlier scores generated for the second input data instances;

identify ones of the second training data instances associated with an outlier score greater than the second threshold; and identify an anomaly associated with each of the ones of the second training data instances associated with an outlier score greater than the second threshold.

* * * * *